(12) United States Patent
Laboy et al.

(10) Patent No.: US 6,442,652 B1
(45) Date of Patent: Aug. 27, 2002

(54) LOAD BASED CACHE CONTROL FOR SATELLITE BASED CPUS

(75) Inventors: Jose Arnaldo Laboy, Tempe; Bradley Robert Schaefer, Chandler, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/389,737

(22) Filed: Sep. 7, 1999

(51) Int. Cl.⁷ .............................................. G06F 12/00
(52) U.S. Cl. ..................... 711/138; 711/154; 364/152; 713/100; 455/12.1
(58) Field of Search .................. 455/12.1; 364/140.01, 364/141, 148.01, 152; 711/118, 138, 152, 154, 163; 713/100; 714/825

(56) References Cited

U.S. PATENT DOCUMENTS 5,257,360 A * 10/1993 Schnizlein et al. .... 365/230.03
5,845,310 A * 12/1998 Brooks ......................... 710/18
6,081,868 A *  6/2000 Brooks ......................... 710/18

* cited by examiner

Primary Examiner—Matthew Kim
Assistant Examiner—C. P. Chace
(74) Attorney, Agent, or Firm—Ingrassia Fisher & Lorenz; Frank J. Bogacz

(57) ABSTRACT

The effect of Single Event Upsets (SEUs) occurring in cache memory (103) utilized in satellites is reduced. The idle time of a processor (102), utilizing cache memory (103), is monitored. If processor (102) idle time reaches a predetermined minimum (205), cache memory (103) is engage. When processor (102) idle time subsequently reaches a predetermined maximum threshold (203), cache memory (103) is disabled.

28 Claims, 2 Drawing Sheets

LOAD BASED CACHE CONTROL FOR SATELLITE BASED CPUS

FIELD OF THE INVENTION

This invention pertains to satellite communications, in general, and to the operation of satellite based central processing units having cache memory utilized in satellite communication systems, in particular.

BACKGROUND OF THE INVENTION

In order to increase the speed of processing within a microprocessor or central processing unit (CPU), designers implement cache memories within the microprocessor integrated circuit chip in order to compensate for the speed differential between main memory access time and processor logic. Processor logic is generally faster than main memory access time, with the result that processing speed is limited by the speed of main memory. A technique used to compensate for the mismatch in operating speeds is to employ an extremely fast small memory having an access time close to processor logic propagation delays between the CPU and main memory. This small, or cache, memory, is used to store segments of programs currently being executed in the CPU and/or temporary data frequently needed in immediate calculations. By making program instructions and data available at a rapid rate, it is possible to increase the performance of the processor.

A described in U.S. Pat. No. 5,918,247 issued to a common assignee, analysis of a large number of typical programs has shown that the references to memory during any given interval of time tend to be confined within a few localized areas in memory. This phenomenon is sometimes referred to as the property of "locality of reference." The reason for this property may be understood by considering that a typical computer program flows in a straight-line fashion with program loops and subroutine calls encountered frequently. When a program loop is executed, the CPU repeatedly refers to the set of instructions in memory that constitute the loop. Every time given subroutine is called, its set of instructions are fetched from memory. Thus, loops and subroutines tend to localize the reference to memory for fetching instructions.

If the active portions of the program and/or data are placed in a fast small memory, the average memory access time can be reduced, thus reducing the total execution time of the program. Such a fast small memory may be a cache memory or a buffer. Such a cache or buffer memory has an access time that is less than the access time of main memory, often by a factor of five to ten.

The fundamental idea of such a cache or buffer memory organization is that by keeping the most frequently accessed instructions and/or data in this fast cache or buffer memory, the average memory access time will approach the access time of the cache or buffer memory.

One problem with utilizing semiconductor components, such a microprocessors or CPUs, in a space environment is that the CPUs will be subjected to high energy rays or particles/ions. The geometries of newer integrated circuits are so small that passage of a high energy particle/ion or cosmic ray through a junction of a semiconductor device can cause an upset in the operation of the device. In such an environment, the presence of high energy rays or particles/ions causes random errors to occur in semiconductor devices. This problem is especially recurrent in semiconductor devices that have chips utilizing less than 3 micron geometry.

In memory systems, when a cosmic ray or high energy particle/ion passes through a sensitive junction of a storage element internal to a circuit, the result is an arbitrary change in the state of that storage element, i.e., a stored bit changes from a "zero" state to a "one" state, or vice versa. This phenomenon of a "one" change of state is called a "single event upset" (SEU). SEU is temporary in nature and disappears when the memory is reused for storing a new bit.

Due to severe irradiation effects occurring in the space environment, commercial processors can be vulnerable to the effects of SEU, which cause processor memory to become temporarily corrupted or changed. The more memory in a processor, the more susceptible it is to upset. Computer cache memory is a particularly SEU-sensitive component of a microprocessor or CPU used in space. Therefore, cache memories are often not used in satellite computers.

Not having a cache memory is a serious performance penalty to processors. Instruction and data cache memories can provide up to ten times performance improvement over similar non-cache memory operations. Therefore, non-cache memory operations can limit system capacity, performance and features offered by a given satellite.

Another way to avoid the effects of SEUs has been to use radiation hardened devices. Because the newest semiconductor devices having cache memory are not radiation hardened, satellite-based CPUs are often not the most recent commercial product.

BRIEF DESCRIPTION OF THE DRAWINGS

The invention will be better understood from a reading of the following detailed description of an embodiment of the invention taken, in conjunction with the drawings in which like reference designators used in the various figures are used to identify like elements, and in which.

DETAILED DESCRIPTION

In many satellite communication systems, processor loading is very peaky. While the satellite is over oceans, the satellite carries very little traffic. As the satellite moves over land masses, the load becomes very heavy and then tapers off again as the satellite moves over the North and South Poles. In addition, the region known as South Atlantic Anomaly (SAA) and the North and South Poles tend to be regions in which the highest amount of SEU activity occurs.

This invention utilizes the fact that processor performance can be measured in real time and that computer cache memory can be enabled and disabled in real time as well. For much of a satellite's orbit the satellite computers can, in accordance with the invention, have cache memories disabled, thereby making the computers more robust against the space environment, and only at those times where the load on the computers is increased are the cache memories engaged. During times in which the satellite is moving over the SAA and the Poles, the cache memories may be disengaged because of low computer activity. Thus, in accordance with the invention, a dynamic cache memory control function is provided which has the benefit of making the satellite computer as robust as possible, while enabling maximum performance gains associated with the use of computer cache memory. A significant benefit of this approach is that commercial off-the-shelf processors, which are inexpensive and non-radiation-hardened, may be used in lieu of expensive and limited availability radiation-hardened processors. In addition, the use of newer and higher performance computing devices may be used to push the "technology envelope" in space applications. To effectively reduce the susceptibility of a computer to SEU in a space borne environment or any other alpha particle rich environment, the cache memory is dynamically controlled so as to enable the cache memory only when run time considerations require it. The cache memory is otherwise disabled. A run time load detection algorithm is used to dynamically engage or disengage cache memory based upon load considerations. The simple control algorithm trends the computer processor's idle time and, when the processor load increases such that idle time is below a threshold, cache memories are then engaged. Similarly, when the processor load relaxes, idle time increases to the point that a threshold is exceeded and the cache memories are disengaged. Hysterisis is provided near the separation in the set points so the cache memories are not thrashed in and out of operation.

Figure 1:
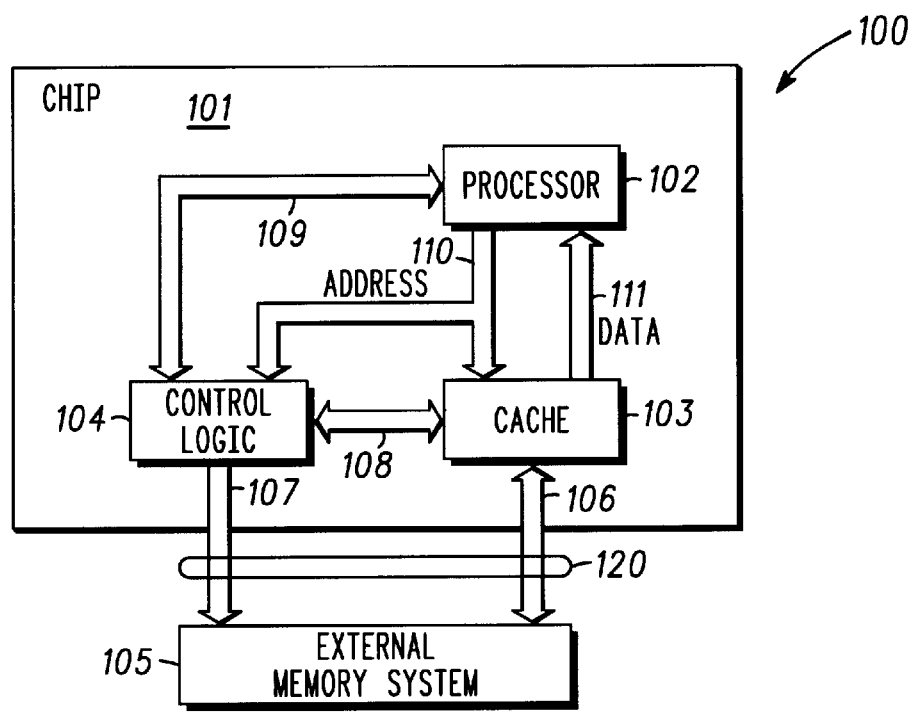
FIG. 1 is a block diagram of a computer utilizing a cache memory to which the invention may be advantageously applied.

Referring to FIG. 1, a portion of a satellite communications system 100 including an integrated circuit chip 101 coupled by bus 120 to external memory 105. Memory 105 may comprise any well-known memory device, such as RAM, ROM, disk storage devices or permanent storage devices. Within the following description, program instructions and data are often referred to separately, but both program instructions and data may be generally referred to as "data."

Chip 101 includes processor 102, which may comprise a typical commercially available microprocessor or central processing unit. Coupled to processor 102 is a united cache memory 103. Cache memory 103 may be a primary cache memory embedded within chip 101 or a secondary cache memory external to chip 101. Further, cache memory 103 may be located anywhere along the path between processor 102 and external memory 105, including being embedded within memory 105. Cache memory 103 receives address information from processor 102 along bus 110 and transmits instructions and/or data information along bus 111 to processor 102.

Chip 101 also includes control logic circuitry 104. Control logic circuitry 104 communicates with processor 102 by bus 109, receives the same address information sent via bus 110 from processor 102 to cache memory 103, is coupled to cache memory 103 by bus 108 and is coupled to memory 105 by bus 107, which may be part of bus 120. Control logic circuitry 104, like cache memory 103, may be located external to chip 101.

Processor 102 issues requests for data by issuing an address along bus 110 that is received by cache memory 103. Cache memory 103 determines whether or not the requested data resides within cache memory 103, and returns the requested data along bus 111 to processor 102 should cache memory 103 contain the requested data.

If the requested data does not reside within cache memory, 103, a request for that data will be passed on to memory 105 along bus 120 in addition to a "fetch" being issued for the line containing the requested data. These requested will be sent to memory 105, which will return the requested word and associated line of data to buffer 103 and processor 102.

The basic operation of such a cache memory 103 is as follows: when processor 102 needs to access an instruction or data, cache memory 103 is examined. If the instruction or data word is found in cache memory 103, it is read by processor 102. If the word addressed by processor 102 is not found in cache memory 103, memory 105 is accessed to read the data word. A block of words containing the one just accessed is then transferred from memory 105 to cache memory 103. In this manner, some data is transferred to cache memory 103 so that future references to memory find the required words in cache memory 103.

The average memory access time of the computer system is improved considerably by the use of cache memory 103. The performance of cache memory 103 is frequently measured in terms of a quantity called a "hit ratio." When the CPU or processor 102 refers to memory and finds the word in cache memory 103, it is said to produce a "hit." If the word is not found in cache memory 103, it counts as a "miss." If the hit ratio is high enough so that most of the time processor 102 accesses cache memory 103 instead of memory 105, the average access time is closer to the access time of cache memory 103. For example, a computer with a cache memory access time of 100 nanoseconds, a main memory access time of 1,000 nanoseconds, and a hit ratio of 0.9 produces an average access time of 200 nanoseconds. This is a considerable improvement over a similar computer with a cache memory whose access time is 1,000 nanoseonds.

Processor 102 is operated by programs stored in memory 105. The program function includes an idle time monitoring function or idle time monitor, which maintains a running average of idle time of processor 102. As processor 102 idle time fluctuates, it will go above a maximum threshold and below a minimum threshold.

Figure 2:
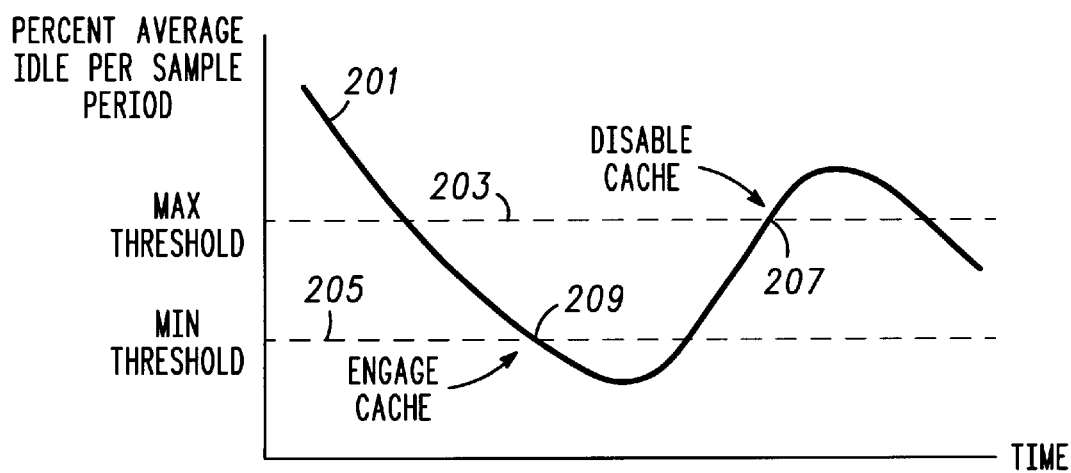
FIG. 2 is a graph illustrating enabling and disabling periods of a cache memory shown in the computer of FIG. 1.

In FIG. 2, a plot of processor percentage idle time is shown as curve 201. As the percentage average idle time per sample period decreases, eventually a predetermined minimum threshold 205 is traversed at point 209, at which time cache memory 103 is enabled. Cache memory 103 will remain enabled until the percentage average idle time per sample period reaches a predetermined maximum threshold 203 as indicated at point 207, whereupon cache memory 103 is disabled. Cache memory 103 will remain disabled until the percentage average idle time again crosses minimum threshold 205. The monitoring of processor activity or the average idle time per sample period is, in the illustrative embodiment, performed by processor 102 utilizing a program stored in memory 105. The idle time monitor, as it may be called, operates such that when the percentage average idle time becomes less than a minimum threshold 205, thereby indicating a heavy load period, cache memory 103 is enabled. When the percentage average idle time is determined to be above a subsequent maximum threshold 203, cache memory 103 is disabled during the corresponding low usage period.

The present invention provides for separate low and high thresholds 205, 203, respectively, which provide hysterisis. The delta or change between the minimum idle time threshold 205 and the maximum idle time threshold 203 may be referred as to as the "hysterisis valley," and is configured to be large enough to prevent small changes in idle time, which would result in a change in the enabled or disabled state of cache memory 103. Rapid enabling and disabling of cache memory 103 due to small changes in idle time is referred to as "thrashing." To achieve stability of cache memory 103 over time, it is necessary to prevent thrashing. The selection of threshold 205 and 203 is made to delay enabling and disabling cache memory 103 until enough time has elapsed to necessitate a change in the status of cache memory 103, thereby avoiding thrashing.

Figure 3:
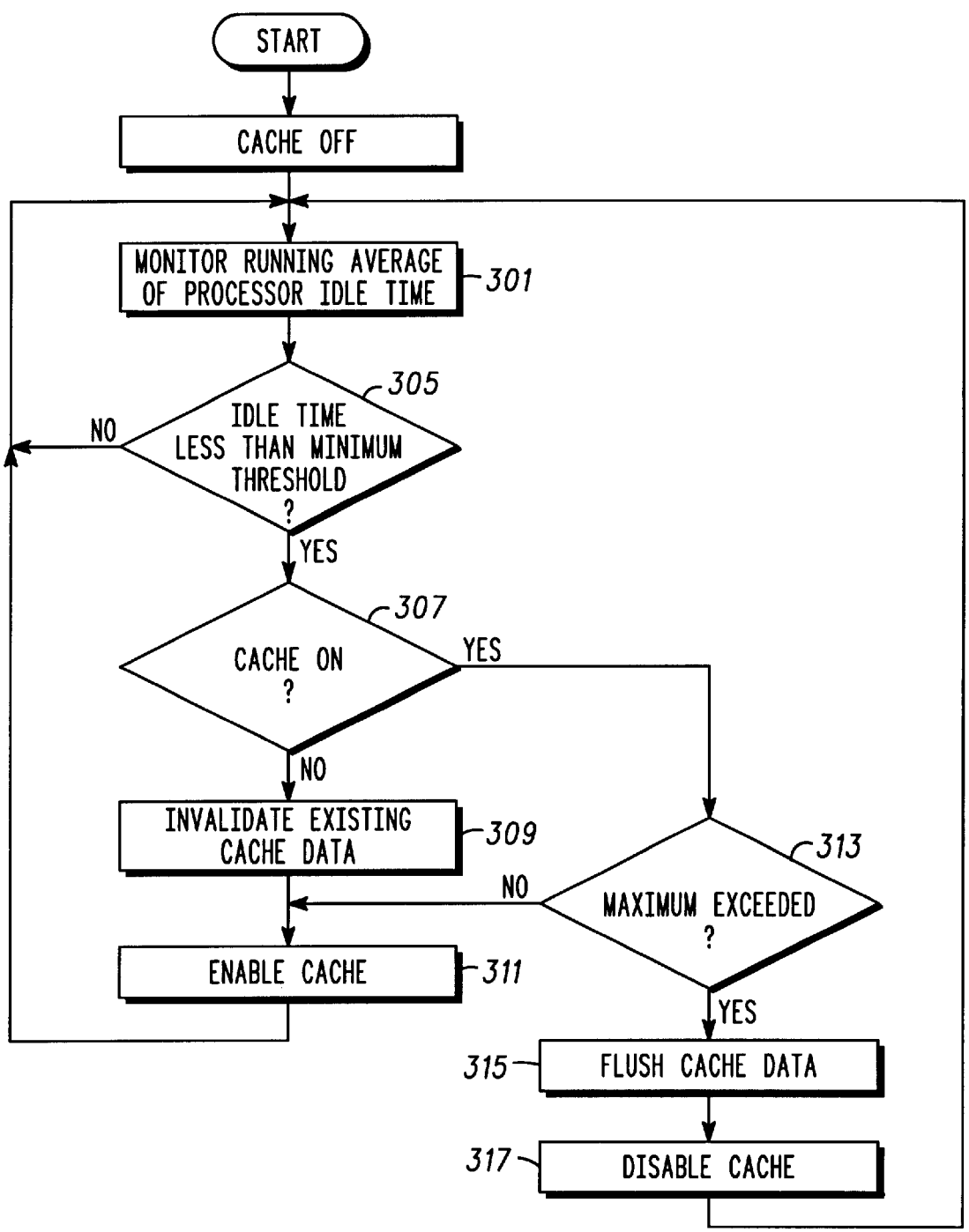
FIG. 3 is a flow diagram illustrating operation of the computer of FIG. 1 in accordance with the principles of the invention.

Turning to FIG. 3, processor 102 continuously monitors its activity by monitoring the running average of processor idle time at step 301. The idle time monitor function provided by processor 102 and the program in memory 105 is utilized to determine when processor 102 idle time has decreased to less than the minimum threshold 205 at step 305. If the idle time is not less than a predetermined minimum, processor 102 continues to monitor the average running time as indicated at step 301. When minimum threshold 205 is exceeded as indicated at step 305, a determination is made as to whether cache memory 103 is enabled at step 307. If cache memory 103 is not enabled at this time, processor 102 invalidates the existing data in cache memory 103 at step 309, and processor 102 enables cache memory 103 at step 311. After cache memory 103 is thus enabled, the process will return to step 301 to continue to monitor average processor idle time. If, at step 305, it is determined that the idle time is less than predetermined level 205 and cache memory 103 is enabled as indicated at step 301, a determination is made to determine if the idle time has reached maximum threshold 203 at step 313. If maximum threshold 203 is not exceeded, cache memory 103 is enabled as indicated at step 311. If maximum threshold 203 is reached as indicated at step 313, processor 102 flushes cache memory 103 at step 315. Cache memory 103 is then disabled at step 317. The process returns to monitoring step 301.

As will be appreciated by those skilled in the art, the idle time monitor is a function which is readily implemented in software, as is the setting of software thresholds for idle time. It is specifically contemplated that he present invention will encompass additional implementations, including hardware, software or a combination of hardware and software. It will be further appreciated that cache memory 103 may be enabled or disabled based upon the position of the satellite. For example, cache memory 103 may be disabled when a satellite is passing over polar regions or the SAA.

As will be understood by those skilled in the art, the invention has been described in conjunction with a specific embodiment and that various changes and modifications may be made to the embodiment without departing either from the spirit or scope of the invention. It is not intended that the invention be limited to the specific embodiment shown and described, but that the invention be limited in scope only by the claims appended hereto.

What is claimed is:

1. A method of operating a computer to minimize single event upsets, such computer comprising a processor, a memory containing programs for operations said processor and a cache memory coupled to said processor, said method comprising:

monitoring idle time of said processor;

identifying a predetermined idle time threshold; and controlling said cache memory when said idle time reaches said predetermined idle time threshold.

2. A method in accordance with claim 1, wherein:

said controlling step comprises enabling said cache memory.

3. A method in accordance with claim 2, comprising:

identifying a second predetermined idle time threshold; and disabling said cache memory when said idle time reaches said second predetermined idle time threshold.

4. A method in accordance with claim 3, comprising:

selecting said predetermined idle time threshold and said second predetermined idle time threshold so as to provide hysterisis.

5. A method in accordance with claim 1, wherein:

said controlling step comprises disabling said cache memory.

6. A method in accordance with claim 1, comprising:

operating said computer in an extraterrestrial vehicle.

7. A method in accordance with claim 1, comprising:

operating said computer in a satellite vehicle.

8. A method in accordance with claim 7, comprising:

using said computer to control satellite communication functions.

9. A method in accordance with claim 1, wherein:

said processor and said cache memory are on an integrated circuit chip.

10. A satellite vehicle comprising:

a processor;

cache memory coupled to said processor; and an idle time monitor monitoring an average idle time of said processor, said idle time monitor controlling said cache memory when said processor average idle time reaches a predetermined idle time threshold.

11. A satellite vehicle in accordance with claim 10, wherein:

said idle time monitor enables said cache memory when said processor average idle time reaches said predetermined idle time threshold.

12. A satellite vehicle in accordance with claim 10, wherein:

said idle time monitor disables said cache memory when processor idle time reaches said predetermined idle time threshold.

13. A satellite vehicle in accordance with claim 12, wherein:

said idle time monitor enables said cache memory when said processor average idle time reaches a second predetermined idle time threshold.

14. A satellite vehicle in accordance with claim 10, comprising:

a memory coupled to said processor; and said idle time monitor comprises a program resident in said memory.

15. A satellite vehicle in accordance with claim 10, wherein:

said processor and said cache memory are both on a single integrated circuit chip.

16. A computer comprising:

a processor;

a cache memory coupled to said processor; and an idle time monitor monitoring an average idle time of said processor and controlling said cache memory when said processor average idle time reaches a predetermined threshold.

17. A computer in accordance with claim 16, wherein:

said controlling comprises enabling said cache memory.

18. A computer in accordance with claim 16, wherein:

said controlling comprises disabling said cache memory.

19. A computer in accordance with claim 16, wherein:

said cache memory is enabled when said processor average idle time reaches said predetermined threshold and is disabled when said processor average idle time reaches a second predetermined threshold.

20. A computer in accordance with claim 16, wherein:

said processor and said cache memory are both on a single integrated circuit chip.

21. A method of operating a computer comprising a processor and a cache memory, said computer being in a satellite vehicle in earth orbit, said method comprising the steps of:

determining periods of time occurring during said earth orbit of said satellite vehicle during which processor idle time is high; and disabling said cache memory during said periods.

22. A method in accordance with claim 21, comprising:

enabling said cache memory when said processor idle time is below a predetermined threshold.

23. A method in accordance with claim 21, wherein:

said satellite vehicle is a communication satellite; and said periods of idle time occur when said satellite vehicle is in predetermined positions relative to the earth.

24. A method in accordance with claim 23, wherein:

said predetermined positions include when said satellite vehicle is traversing polar regions of the earth.

25. A method in accordance with claim 24, wherein:

said predetermined positions include satellite positions over a South Atlantic Anomaly.

26. A method in accordance with claim 25, comprising:

enabling said cache memory when said processor idle time is below a predetermined threshold.

27. A method in accordance with claim 23, wherein:

said predetermined positions include satellite positions over a South Atlantic Anomaly.

28. A method in accordance with claim 27, comprising:

enabling said cache memory when said processor idle time is below a predetermined threshold.

* * * * *